A. LORENZ & D. W. SAXTON.
MILK PAIL.
APPLICATION FILED NOV. 29, 1913.
1,102,156.
Patented June 30, 1914.
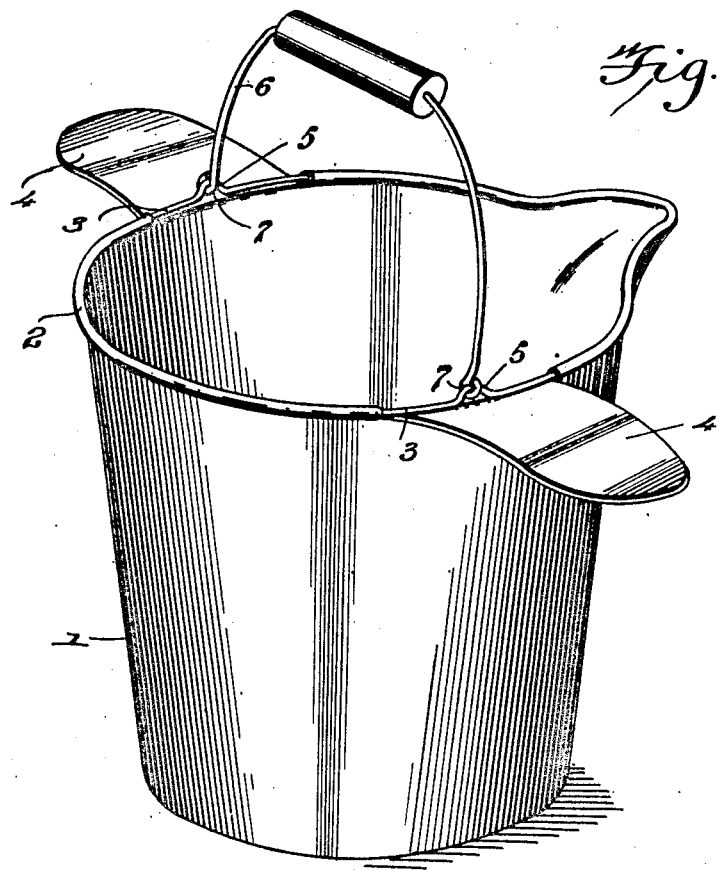
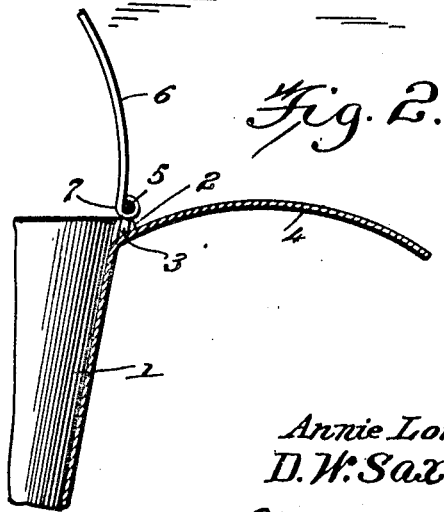
Inventors
Annie Lorenz and
D. W. Saxton
By Victor J. Evans
Attorney
Witnesses

UNITED STATES PATENT OFFICE.

ANNIE LORENZ AND DANIEL W. SAXTON, OF COVE, OREGON.

MILK-PAIL.

1,102,156.  Specification of Letters Patent.  Patented June 30, 1914.

Application filed November 29, 1913. Serial No. 803,364.

*To all whom it may concern:*

Be it known that we, ANNIE LORENZ and DANIEL W. SAXTON, citizens of the United States, residing at Cove, in the county of Union and State of Oregon, have invented new and useful Improvements in Milk-Pails, of which the following is a specification.

This invention relates to milk pails and it consists in the novel features hereinafter described and claimed.

An object of the invention is to provide a milk pail of simple structure having at its upper edge and at its opposite sides outwardly disposed flanges adapted to be positioned upon the knees of a person while sitting in order that the pail may be properly supported during the milking operation.

With the above object in view the pail comprises a body which is curled along the major portion of its upper edge and a stiffening wire is inserted in the said curl. The opposite side portions of the pail at its upper edge are provided with outstanding flanges which are continuous with the material constituting the body of the pail and the wire passes over these flanges. The wire is provided at points above the flanges and approximately midway between their front and rear edges with kinks and the eyes of the pail handle receive the kinks of the wire. By so constructing the pail the same is devoid of upstanding ears at its upper edge and consequently when the bail handle is swung down and during the milking operation there are no upward projections at the upper portion of the pail to interfere with the operation.

In the accompanying drawing:—Figure 1 is a perspective view of the pail. Fig. 2 is a detailed sectional view of a portion of the pail.

The pail comprises a body 1 which is formed from sheet metal, preferably tin. The major portion of the upper edge of the body 1 is curled as at 2 and a stiffening wire 3 is inserted in the said curled portion in the usual manner. The body 1 is provided at its upper edge and at its opposite sides with outstanding flanges 4 which are formed from the same material as that from which the body is formed. These flanges 4 extend under the wire 3 so that the wire may be continuous around the upper edge of the pail. The wire 3 is provided with kinks 5 which are located above the flanges 4. A bail handle 6 is provided at its ends with eyes 7 which receive the kinks 5. The kinks 5 are sufficiently large to permit the bail handle 6 to swing down and lie in close contact with the upper edge of the body 1.

In use a person in seated posture places the body 1 between the legs and the flanges 4 rest upon the upper portions of the knees. Thus the pail is supported by the legs above the ground and during the milking operation the bail 6 may be permitted to fall and lie in close contact with the upper edge of the body 1. When so positioned the milking operation may be readily accomplished without interference by the presence of upstanding or upwardly projecting portions of the pail. The flanges 4 are of sufficient area to effectually support the pail upon the legs of the operator but at the same time they are not so extensive as to interfere with the carrying of the pail by one who is walking and supporting the pail by the bail handle 6.

It will therefore be seen that a pail of simple structure is provided and that the parts coöperate with each other to effectually brace the body of the pail and at the same time the body is devoid of projecting and interfering parts or members.

Having described the invention what is claimed is:—

A pail comprising a body provided at its upper edge and at its opposite sides with spaced curls, said body having outstanding flanges located in the spaces between the curls a wire held in the curls and bridging the spaces between the curls and having contact with the upper surfaces of the flanges, said wire being provided at points between the edges of the flanges with kinks, and a bail having eyes which receive the kinks of the wire, said flanges preventing the eyes from moving along the wire and disengaging the kinks thereof.

In testimony whereof we affix our signatures in presence of two witnesses.

ANNIE LORENZ.
DANIEL W. SAXTON.

Witnesses:
J. E. TRIPPLER,
SAMUEL G. WHITE.